(12) United States Patent
O'Connell et al.

(10) Patent No.: US 8,789,600 B2
(45) Date of Patent: Jul. 29, 2014

(54) FRACING SYSTEM AND METHOD

(75) Inventors: Maria M. O'Connell, Cypress, TX (US); Yang Xu, Houston, TX (US); Hector H. Mireles, Spring, TX (US); Lale Korkmaz, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 402 days.

(21) Appl. No.: 12/862,128

(22) Filed: Aug. 24, 2010

(65) Prior Publication Data

US 2012/0048556 A1  Mar. 1, 2012

(51) Int. Cl.
*E21B 43/26* (2006.01)
*E21B 41/00* (2006.01)
*E21B 34/06* (2006.01)
*E21B 23/00* (2006.01)

(52) U.S. Cl.
CPC .............. *E21B 23/006* (2013.01); *E21B 41/00* (2013.01); *E21B 34/063* (2013.01)
USPC ................... 166/308.1; 166/177.5; 166/332.1

(58) Field of Classification Search
CPC ...... E21B 41/00; E21B 34/063; E21B 23/006
USPC .......................... 166/308.1, 177.5, 332.1, 191
See application file for complete search history.

(56) References Cited

U.S. PATENT DOCUMENTS

| | | |
|---|---|---|
| 1,883,071 A | 12/1928 | Stone |
| 2,277,816 A | 3/1942 | Brown |
| 2,376,594 A | 5/1945 | Hite |
| 2,448,423 A | 8/1948 | Dodge |
| 2,562,455 A | 7/1951 | Gridley |
| 2,769,454 A | 11/1956 | Bletcher et al. |
| 2,812,717 A | 11/1957 | Brown |
| 2,822,757 A | 2/1958 | Colberly |
| 2,973,006 A | 2/1961 | Nelson |

(Continued)

FOREIGN PATENT DOCUMENTS

| | | |
|---|---|---|
| CA | 2760107 | 11/2010 |
| EP | 0427422 A2 | 5/1991 |

(Continued)

OTHER PUBLICATIONS

Response to Restriction Requirement dated Apr. 22, 2009 in U.S. Appl. No. 11/891,715, U.S. Patent and Trademark Office, U.S.A.

(Continued)

*Primary Examiner* — Yong-Suk (Philip) Ro
(74) *Attorney, Agent, or Firm* — Cantor Colburn LLP

(57) ABSTRACT

A plug counter includes a seat receptive of a plug in a first position and capable of passing the plug in a second position. A first sleeve is in operable communication with the seat and is longitudinally movable in response to movement of the seat between the first position and the second position. A second sleeve is in operable communication with at least one of the first sleeve and the seat and is configured to index upon passage of the plug. A key is in operable communication with the seat and is configured to prevent movement of the seat to the second position after a selected number of plugs have passed the seat. A third sleeve is in operable communication with the first sleeve, and a release member is in operable communication with the third sleeve and is configured to move the third sleeve after it is released.

14 Claims, 7 Drawing Sheets

(56) References Cited

U.S. PATENT DOCUMENTS

| | | |
|---|---|---|
| 3,007,527 A | 11/1961 | Nelson |
| 3,013,612 A | 12/1961 | Angel |
| 3,117,797 A | 1/1964 | Buck |
| 3,148,731 A | 9/1964 | Holden |
| 3,211,232 A | 10/1965 | Grimmer |
| 3,263,752 A | 8/1966 | Conrad |
| 3,358,771 A | 12/1967 | Berryman |
| 3,510,103 A | 5/1970 | Carsello |
| 3,517,939 A | 6/1970 | Jaehn |
| 3,566,964 A | 3/1971 | Livingston |
| 3,583,714 A | 6/1971 | Weltzer et al. |
| 3,599,998 A | 8/1971 | Kiwalle et al. |
| 3,667,505 A | 6/1972 | Radig |
| 3,669,462 A | 6/1972 | Parsons |
| 3,703,104 A | 11/1972 | Tamplen |
| 3,727,635 A | 4/1973 | Todd |
| 3,761,008 A | 9/1973 | Goulder |
| 3,797,255 A | 3/1974 | Kammerer, Jr. et al. |
| 3,901,315 A | 8/1975 | Parker et al. |
| 3,954,138 A | 5/1976 | Miffre |
| 3,997,003 A | 12/1976 | Adkins |
| 4,067,358 A | 1/1978 | Streich |
| 4,160,478 A | 7/1979 | Calhoun et al. |
| 4,176,717 A | 12/1979 | Hix |
| 4,190,239 A | 2/1980 | Schwankhart |
| 4,246,968 A | 1/1981 | Jessup et al. |
| 4,260,017 A | 4/1981 | Nelson et al. |
| 4,291,722 A | 9/1981 | Churchman |
| 4,292,988 A | 10/1981 | Montgomery |
| 4,355,685 A | 10/1982 | Beck |
| 4,390,065 A | 6/1983 | Richardson |
| 4,423,777 A | 1/1984 | Mullins et al. |
| 4,433,726 A | 2/1984 | Preston, Jr. et al. |
| 4,438,811 A | 3/1984 | Patel |
| 4,448,216 A | 5/1984 | Speegle et al. |
| 4,474,241 A | 10/1984 | Freeman |
| 4,478,279 A | 10/1984 | Puntar et al. |
| 4,513,822 A | 4/1985 | Gilbert |
| 4,537,383 A | 8/1985 | Fredd |
| 4,554,981 A | 11/1985 | Davies |
| 4,566,541 A | 1/1986 | Moussy et al. |
| 4,576,234 A | 3/1986 | Upchurch |
| 4,583,593 A | 4/1986 | Zunkel et al. |
| 4,655,290 A | 4/1987 | Smith, Jr. |
| 4,657,078 A | 4/1987 | Fraser, III et al. |
| 4,662,785 A | 5/1987 | Gibb et al. |
| 4,669,538 A | 6/1987 | Szarka |
| 4,711,326 A | 12/1987 | Baugh et al. |
| 4,714,116 A | 12/1987 | Brunner |
| 4,715,445 A | 12/1987 | Smith, Jr. |
| 4,726,425 A | 2/1988 | Smith, Jr. |
| 4,729,432 A | 3/1988 | Helms |
| 4,762,447 A | 8/1988 | Marantette |
| 4,823,882 A | 4/1989 | Stokley et al. |
| 4,826,135 A | 5/1989 | Mielke |
| 4,856,591 A | 8/1989 | Donovan et al. |
| 4,893,678 A | 1/1990 | Stokley et al. |
| 4,944,379 A | 7/1990 | Haaser |
| 4,949,788 A | 8/1990 | Szarka et al. |
| 4,979,561 A | 12/1990 | Szarka |
| 4,991,653 A | 2/1991 | Schwegman |
| 4,991,654 A | 2/1991 | Brandell et al. |
| 5,020,946 A | 6/1991 | Nann |
| 5,029,643 A | 7/1991 | Winslow et al. |
| 5,029,644 A | 7/1991 | Szarka et al. |
| 5,056,599 A | 10/1991 | Comeaux et al. |
| 5,117,913 A | 6/1992 | Themig |
| 5,207,274 A | 5/1993 | Streich et al. |
| 5,230,390 A | 7/1993 | Zastresek et al. |
| 5,244,044 A | 9/1993 | Henderson |
| 5,297,580 A | 3/1994 | Thurman |
| 5,305,837 A | 4/1994 | Johns et al. |
| 5,325,917 A | 7/1994 | Szarka |
| 5,335,727 A | 8/1994 | Cornette et al. |
| 5,343,946 A | 9/1994 | Morrill |
| 5,343,954 A | 9/1994 | Bohlen et al. |
| 5,381,862 A | 1/1995 | Szarka et al. |
| 5,394,941 A | 3/1995 | Venditto et al. |
| 5,398,947 A | 3/1995 | Cook |
| 5,529,126 A | 6/1996 | Edwards |
| 5,551,512 A | 9/1996 | Smith |
| 5,567,093 A | 10/1996 | Richmond |
| 5,609,178 A | 3/1997 | Hennig et al. |
| 5,620,050 A | 4/1997 | Barbee |
| 5,695,009 A | 12/1997 | Hipp |
| 5,704,393 A | 1/1998 | Connell et al. |
| 5,762,142 A | 6/1998 | Connell et al. |
| 5,775,421 A | 7/1998 | Duhon et al. |
| 5,775,428 A | 7/1998 | Davis et al. |
| 5,813,483 A | 9/1998 | Latham et al. |
| 5,960,881 A | 10/1999 | Allamon et al. |
| 6,050,340 A | 4/2000 | Scott |
| 6,053,250 A | 4/2000 | Echols |
| 6,056,053 A | 5/2000 | Giroux et al. |
| 6,079,496 A | 6/2000 | Hirth |
| 6,102,060 A | 8/2000 | Howlett et al. |
| 6,155,350 A | 12/2000 | Melenyzer |
| 6,173,795 B1 | 1/2001 | McGarian et al. |
| 6,220,350 B1 | 4/2001 | Brothers et al. |
| 6,227,298 B1 | 5/2001 | Patel |
| 6,253,861 B1 | 7/2001 | Carmichael et al. |
| 6,293,517 B1 | 9/2001 | Cunningham |
| 6,378,609 B1 | 4/2002 | Oneal et al. |
| 6,474,412 B2 | 11/2002 | Hamilton et al. |
| 6,530,574 B1 | 3/2003 | Bailey et al. |
| 6,547,007 B2 | 4/2003 | Szarka et al. |
| 6,626,244 B2 | 9/2003 | Powers |
| 6,634,428 B2 | 10/2003 | Krauss et al. |
| 6,644,412 B2 | 11/2003 | Bode et al. |
| 6,666,273 B2 | 12/2003 | Laurel |
| 6,668,933 B2 | 12/2003 | Kent |
| 6,681,860 B1 | 1/2004 | Yokley et al. |
| 6,712,145 B2 | 3/2004 | Allamon |
| 6,712,415 B1 | 3/2004 | Darbishire et al. |
| 6,763,891 B2 | 7/2004 | Humphrey et al. |
| 6,834,726 B2 | 12/2004 | Giroux et al. |
| 6,866,100 B2 | 3/2005 | Gudmestad et al. |
| 6,896,049 B2 | 5/2005 | Moyes |
| 6,907,936 B2 | 6/2005 | Fehr et al. |
| 6,948,561 B2 | 9/2005 | Myron et al. |
| 6,983,795 B2 | 1/2006 | Zuklic et al. |
| 7,150,326 B2 | 12/2006 | Bishop et al. |
| 7,210,534 B2 | 5/2007 | Hayter et |
| 7,322,408 B2 | 1/2008 | Howlett |
| 7,322,417 B2 | 1/2008 | Rytlewski et al. |
| 7,325,617 B2 | 2/2008 | Murray |
| 7,337,847 B2 | 3/2008 | McGarian et al. |
| 7,350,578 B2 | 4/2008 | Szarka et al. |
| 7,377,321 B2 | 5/2008 | Rytlewski |
| 7,387,165 B2 | 6/2008 | Lopez de Cardenas et al. |
| 7,416,029 B2 | 8/2008 | Telfer et al. |
| 7,467,664 B2 | 12/2008 | Cochran et al. |
| 7,503,390 B2 | 3/2009 | Gomez |
| 7,503,392 B2 | 3/2009 | King et al. |
| 7,520,336 B2 | 4/2009 | Mondelli et al. |
| 7,730,953 B2 | 6/2010 | Casciaro |
| 7,798,212 B2 | 9/2010 | Bolze et al. |
| 7,832,472 B2 | 11/2010 | Themig |
| 7,909,120 B2 | 3/2011 | Slack |
| 7,971,883 B2 | 7/2011 | Soroka et al. |
| 8,061,429 B2 | 11/2011 | Du et al. |
| 8,393,389 B2 | 3/2013 | Brisco et al. |
| 8,443,894 B2 | 5/2013 | Coghill et al. |
| 8,684,096 B2 | 4/2014 | Harris et al. |
| 2001/0007284 A1 | 7/2001 | French et al. |
| 2004/0007365 A1 | 1/2004 | Hill et al. |
| 2004/0221984 A1 | 11/2004 | Cram |
| 2005/0061372 A1 | 3/2005 | McGrath et al. |
| 2005/0072572 A1 | 4/2005 | Churchill |
| 2005/0126638 A1 | 6/2005 | Gilbert |
| 2005/0205264 A1 | 9/2005 | Starr et al. |
| 2006/0124310 A1* | 6/2006 | Lopez de Cardenas et al. ............ 166/313 |
| 2006/0169463 A1 | 8/2006 | Howlett |

(56) References Cited

U.S. PATENT DOCUMENTS

| | | | |
|---|---|---|---|
| 2006/0175092 | A1 | 8/2006 | Mashburn |
| 2006/0213670 | A1 | 9/2006 | Bishop et al. |
| 2006/0243455 | A1 | 11/2006 | Telfer et al. |
| 2007/0007007 | A1 | 1/2007 | Themig et al. |
| 2007/0012438 | A1 | 1/2007 | Hassel-Sorensen |
| 2007/0023087 | A1 | 2/2007 | Krebs et al. |
| 2007/0095538 | A1 | 5/2007 | Szarka et al. |
| 2007/0272413 | A1 | 11/2007 | Rytlewski et al. |
| 2008/0066924 | A1 | 3/2008 | Xu |
| 2008/0093080 | A1 | 4/2008 | Palmer et al. |
| 2008/0190620 | A1 | 8/2008 | Posevina et al. |
| 2008/0217025 | A1 | 9/2008 | Ruddock et al. |
| 2008/0308282 | A1 | 12/2008 | Standridge et al. |
| 2009/0032255 | A1 | 2/2009 | Surjaatmadja et al. |
| 2009/0044944 | A1 | 2/2009 | Murray et al. |
| 2009/0044946 | A1 | 2/2009 | Schasteen et al. |
| 2009/0044955 | A1 | 2/2009 | King et al. |
| 2009/0056934 | A1 | 3/2009 | Xu |
| 2009/0056952 | A1 | 3/2009 | Churchill |
| 2009/0107680 | A1 | 4/2009 | Surjaatmadja |
| 2009/0159289 | A1 | 6/2009 | Avant et al. |
| 2009/0308588 | A1* | 12/2009 | Howell et al. ............... 166/66.4 |
| 2010/0294514 | A1 | 11/2010 | Crow et al. |
| 2011/0048723 | A1 | 3/2011 | Edwards |
| 2011/0073330 | A1 | 3/2011 | Radford |
| 2011/0108284 | A1 | 5/2011 | Flores et al. |
| 2011/0174500 | A1 | 7/2011 | Davies et al. |
| 2011/0180274 | A1 | 7/2011 | Wang et al. |

FOREIGN PATENT DOCUMENTS

| | | |
|---|---|---|
| GB | 2281924 A | 3/1995 |
| JP | 63174808 A | 7/1988 |
| WO | 00/15943 | 3/2000 |

OTHER PUBLICATIONS

Office Action dated Apr. 9, 2009, in U.S. Appl. No. 11/891,715, U.S. Patent and Trademark Office, U.S.A.

Ross, C. M., et al., "Current Materials and Devices for Control of Fluid Loss," SPE 54323, Apr. 1999, pp. 1-16.

Hoffman, C.R., "One-Trip Sand-Control/Liner Hangar/ Big-Bore Completion System," SPE 101086, Sep. 2006, pp. 1-10.

Baker Hughes, Baker Oil Tools, Conventional Fishing Technical Unit; Pump Out Sub Product Family No. H14061, Jun. 7, 2005, 1 page.

International Search Report, Feb. 11, 2009 pp. 1-3, PCT/US2008/072732, Korean Intellectual Property Office.

International Search Report, Feb. 11, 2009, pp. 1-3, PCT/US2008/072734, Korean Intellectual Property Office.

International Search Report, Feb. 11, 2009, pp. 1-3, PCT/US2008/072735, Korean Intellectual Property Office.

Notification of Transmittal of the International Search Report and the Written Opinion of the International Searching Authority, or the Declaration, Feb. 11, 2009, pp. 1-4, PCT/US2008/072732, Korean Intellectual Property Office.

Notification of Transmittal of the International Search Report and the Written Opinion of the International Searching Authority, or the Declaration, Feb. 11, 2009, pp. 1-4, PCT/US2008/072734, Korean Intellectual Property Office.

Notification of Transmittal of the International Search Report and the Written Opinion of the International Searching Authority, or the Declaration, Feb. 11, 2009, pp. 1-4, PCT/US2008/072735, Korean Intellectual Property Office.

Written Opinion of the International Searching Authority, Feb. 11, 2009, pp. 1-3, PCT/US2008/072732, Korean Intellectual Property Office.

Written Opinion of the International Searching Authority, Feb. 11, 2009, pp. 1-4, PCT/US2008/072734, Korean Intellectual Property Office.

Written Opinion of the International Searching Authority, Feb. 11, 2009, pp. 1-4, PCT/US2008/072735, Korean Intellectual Property Office.

G.L. Rytlewski, A Study of Fracture Initiation Pressures in Cemented Cased-Hole Wells Without Perforations, May 15, 2006, pp. 1-10, SPE 100572, Society of Petroleum Engineers, U.S.A.

Boscan, J., et al., "Successful Well Testing Operations in High-Pressure/High-Temperature Encironment; Case Histories," SPE 84096, Oct. 2003, pp. 1-15.

International Search Report, Jan. 19, 2009, pp. 1-3, PCT/US2008/072470, Korean Intellectual Property Office.

Notification of Transmittal of the International Search Report and the Written Opinion of the International Searching Authority, or the Declaration, Jan. 19, 2009, pp. 1-4, PCT/US2008/072470, Korean Intellectual Property Office.

Written Opinion of the International Searching Authority, Jan. 19, 2009, pp. 1-3, PCT/US2008/072470, Korean Intellectual Property Office.

Notice of Allowance & Fees Due and Notice of Allowability dated Jan. 5, 2009, in U.S. Appl. No. 11/891,713, U.S. Patent and Trademark Office, U.S.A.

Office Action dated Jul. 16, 2008 in U.S. Appl. No. 11/891,713 U.S. Patent and Trademark Office, U.S.A.

Office Action dated Jun. 19, 2009, in U.S. Appl. No. 11/891,715, U.S. Patent and Trademark Office, U.S.A.

Office Action dated Jun. 25, 2009, in U.S. Appl. No. 11/891,714, USPTO, U.S.A.

Brad Musgrove, Multi-Layer Fracturing Solution Treat and Produce Completions, Nov. 12, 2007, pp. 1-23, Schlumberger, U.S.A.

Response to Office Action dated Oct. 15, 2008, in U.S. Appl. No. 11/891,713, U.S. Patent and Trademark Office, U.S.A.

RFID Keystone Module, RFID & Intelligent Products, Petrowell retrieved online on May 27, 2009 from: http://www.petrowell.co.uk/index2.php?option=com_docman&task=doc_view&gid=15&Itemid=26.

StageFRAC Maximize Reservoir Drainage, 2007, pp. 1-2, Schlumberger, U.S.A.

TAP Completion System, Schlumberger, 4 pages, Dec. 2007.

International Search Report and Written Opinion; Date of Mailing Aug. 29, 2011; International Application No. PCT/US2011/022523; International Filing Date Jan. 26, 2011; Korean Intellectual Property Office; International Search Report 5 pages; Written Opinion 3 pages.

Notification of Transmittal of the International Search Report and the Written Opinion of the International Searching Authority; PCT/US2010/044856; Mailed Apr. 15, 2011.

Notification of Transmittal of the International Search Report and the Written Opinion of the International Searching Authority; PCT/US2010/044383; Mailed Apr. 15, 2011.

International Search Report; PCT/US2010/044399; International Searching Authority KIPO; Mailed Mar. 21, 2011.

Notification of Transmittal of the International Search Report and the Written Opinion of the International Searching Authority; PCT/US2010/054487; International Searching Authority; KIPO; Mailed Jun. 3, 2011.

Notification of Transmittal of the International Search Report and the Written Opinion of the International Searching Authority; PCT/US2010/049810; International Searching Authority KIPO; Mailed Apr. 25, 2011.

International Search Report and Written Opinion of the International Searching Authority; PCT/US2010/044378; Mailed Mar. 17, 2011.

International Search Report; PCT/US2010/033737; Korean Intellectual Property Office; Mailed Jan. 24, 2011.

International Search Report; Date of Mailing Jan. 24, 2011; International Appln No. PCT/US2010/034736; 3 Pages.

International Search Report; Date of Mailing Jan. 24, 2011; Internatiaonal Appln. No. PCT/US2010/034752; 3 Pages.

(56) References Cited

OTHER PUBLICATIONS

Nternational Search Report and Written Opinion; Date of Mailing Feb. 11, 2011; International Appln No. PCT/US2010/041049; International Search Report 5 Pages and Written Opinion 3 Pages.

Notification of Transmittal of the International Search Report and the Written Opinion of the International Searching Authority; PCT/US2011/041663; Korean Intellectual Property Office; Mailed Dec. 14, 2011; 8 pages.

* cited by examiner

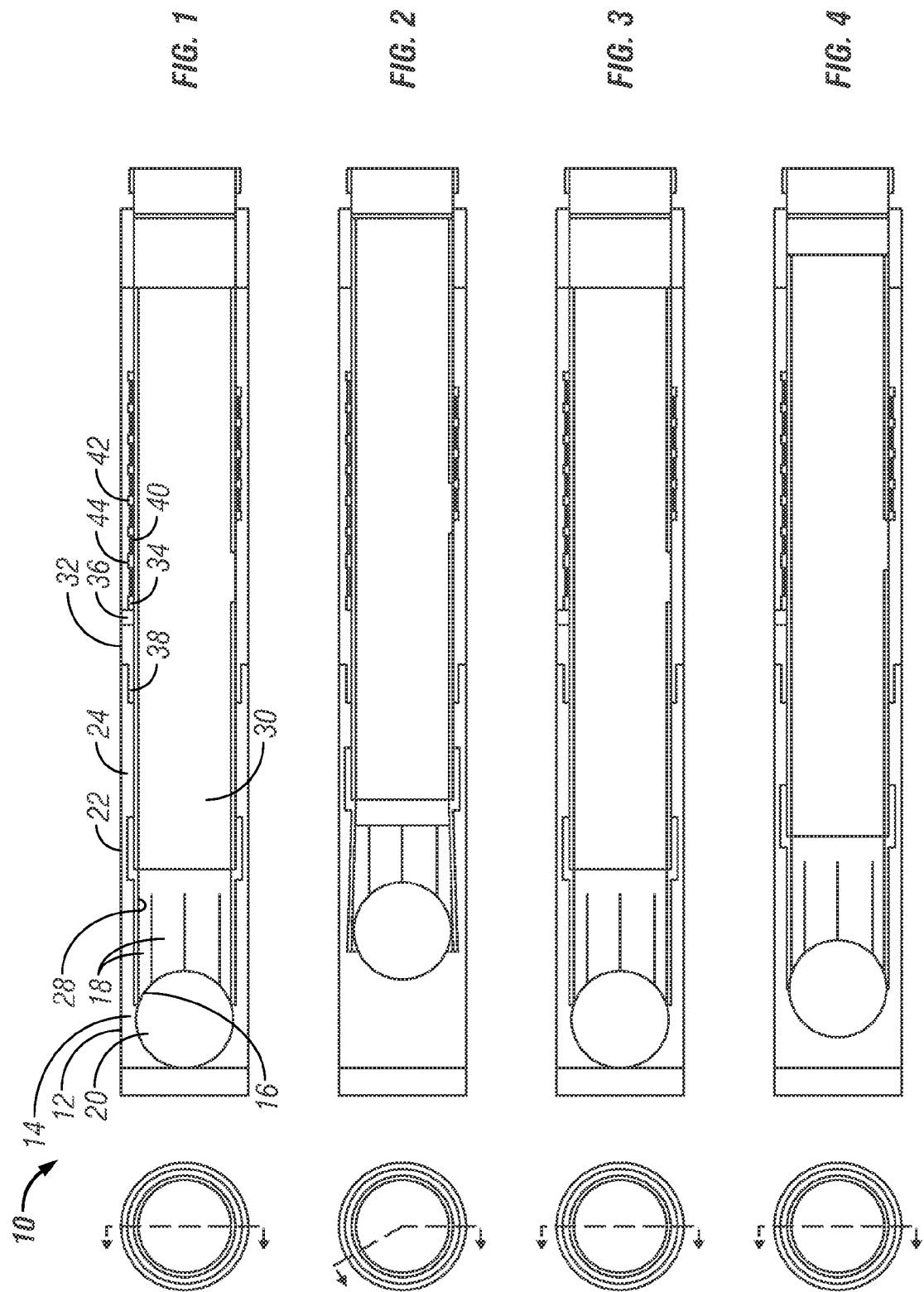

US 8,789,600 B2

FRACING SYSTEM AND METHOD

BACKGROUND

In the Drilling and completion industries it is often desirable to affect tools or formations at a great distance from a surface located facility such as a rig. One example of an operation intended to affect a formation is a fracturing operation often referred to as fracing. In order to perform such an operation, hydraulic pressure is built within a tubing string until the pressure exceeds formation capability for holding that pressure and fractures the formation. This type of operation is most effective if done in small incremental sections of a borehole for reasons related to control and distribution of fractures to serve the ultimate purpose of the borehole. Such purposes include hydrocarbon production and Carbon Dioxide sequestration, for example.

In the art, fracturing discrete locations of the borehole tends to require a number of tools related to the pressuring of discrete locations. Where multiple fracturing locations are contemplated, generally a staged system must be built and administered correctly for it to work. One such system uses progressively larger seat diameters from the toe back to surface and then corresponding progressively increasing diameter plugs or balls. While the system works well, it is limited by the number of different size balls that can be used. Tolerance is also required in any system (due to such things as irregular shape of tubing secondary to borehole irregularity), which therefore further limits the number of diameters usable in a particular system.

Since fracturing and other operations where it is desirable to isolate discrete locations continue to become more prevalent and ubiquitous, alternate systems for accessing and manipulating the downhole environment are always well received.

SUMMARY

Disclosed herein is a plug counter. The plug counter includes a seat receptive of a plug in a first position and capable of passing the plug in a second position. A first sleeve is in operable communication with the seat and is longitudinally movable in response to movement of the seat between the first position and the second position. A second sleeve is in operable communication with at least one of the first sleeve and the seat and is configured to index upon passage of the plug. A key is in operable communication with the seat and is configured to prevent movement of the seat to the second position after a selected number of plugs have passed the seat. A third sleeve is in operable communication with the first sleeve, and a release member is in operable communication with the third sleeve and is configured to move the third sleeve with the first sleeve after it is released.

Further disclosed is a method of fracing multiple zones. The method includes, running a plurality of plugs having substantially the same dimensions, indexing a plurality of plug counters with each of the plurality of plugs run, opening a fracing valve with one of the plurality of plug counters with the running of a first one of the plurality of plugs, and plugging one of the plurality of plug counters with the running of the first one of the plurality of plugs. Also included is pressuring up and fracing a formation through the opened fracing valve, running more of the plurality of plugs, further indexing some of the plurality of plug counters with each of the plurality of plugs run, opening another fracing valve with the running of a second one of the plurality of plugs, plugging one of the plurality of plug counters with the running of the second one of the plurality of plugs, and pressuring up and fracing a formation through the opened fracing valve.

Further disclosed is a fracing system which includes a plurality of same sized plugs and a plurality of clusters of fracing valves, wherein each of the plurality of clusters is controllable by the plurality of same sized plugs to open at least one of the plurality of the fracing valves within each cluster and plugging an outlet of each cluster to allow fracing thereof separately from each of the other clusters of the plurality of clusters.

Further disclosed is a valve including a tubular having at least one port, and a sleeve in operable communication with the tubular configured to open the at least one port in response to moving from a first position to a second position. Also included is a defeatable seat in operable communication with the sleeve, wherein the valve is configured to pass a selected number of same sized plugs without shifting the sleeve from the first position to the second position and to pass a next one of the same sized plugs after the selected number of same sized plugs only after shifting the sleeve from the first position to the second position.

BRIEF DESCRIPTION OF THE DRAWINGS

Referring now to the drawings wherein like elements are numbered alike in the several Figures:

FIGS. 1-4 illustrate a cross sectional view of one embodiment of a portion of the tool disclosed herein in four different positions;

DETAILED DESCRIPTION

Figure 5:
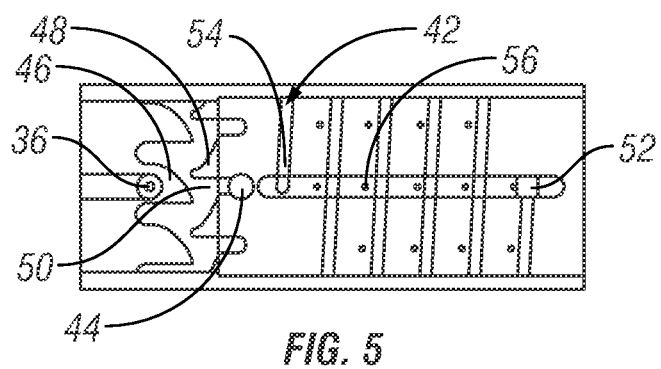
FIGS. 5-8 illustrate in partial transparent view a counter portion of the tool disclosed herein in four different positions corresponding to the positions shown in FIGS. 1-4.
Figure 6:
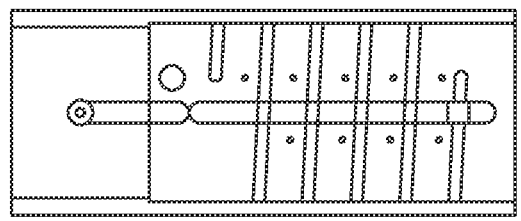
Figure 7:
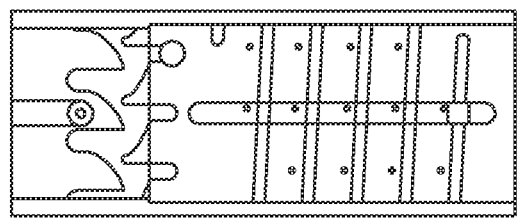

Referring to FIGS. 1-4, a portion of plug counter tool 10 is illustrated in longitudinal cross section in four different positions to make apparent not only its structural constituents but its operation as well. It is initially noted that the term "plug" as used herein is intended to encompass tripping balls, darts, and similar structures that can be propagated through a borehole and/or tubing string to reach remote locations therewithin. The plug counter tool embodiments disclosed herein facilitate the use of a single size plug for multiple actuation sequences. For example, where multiple fracture points are desired in a borehole, traditional fracturing would require a number of different diameter plugs used sequentially from smaller to larger as operations progress up the hole. With the tool embodiments described herein only one size plug is needed.

Referring directly to FIG. 1, an outer housing 12 includes a support 14 to support a moveable plug seat 16, which in the case of FIG. 1 is presented by a set of collet fingers 18. The support 14 and movable seat 16 operate together to catch a plug 20 after which the plug is passed or denied passage as discussed hereunder. The fingers 18 are supported by support 14 while the collet fingers are in a first position shown in FIG.

1. Support for the fingers 18 is dependent upon the position of collet 22, which is dependent upon the ability of a spring 24 to hold the collet 22 in the first position shown in FIG. 1. More specifically, when a plug is seated in the seat 16 pressure can and will in operation be built uphole of the plug. The spring rate of the spring 24 selected dictates the amount of fluid pressure that can be resisted before the collet 22 moves in a downhole direction and the fingers 18 become unsupported. The spring 24 is a compression spring and as illustrated is a coil spring. It will hold the collet 22 in the illustrated first position until a plug 20 engages the seat 16 and sufficient fluid pressure uphole of the plug overcomes the spring force of spring 24 and compresses the same. As the spring 24 is overcome by fluid pressure, the collet 22 moves in a downhole direction (to the right in the Figure) and moves the fingers 18 off of the support 14 to a second position. Just downhole of the support 14 is a plug passage recess 28 that will allow radial expansion of the fingers 18 (see FIG. 2) by an amount sufficient to allow passage of the plug 20 through the seat 16. After passage of the plug 20, fluid pressure equalizes across the seat 16 and the collet 22 returns to the first position of FIG. 1 under the bias of the spring 24.

Connected to the collet 22 is j-slot sleeve 30. Sleeve 30 moves axially of the tool 10 along with the collet 22. At a downhole end of the housing 12, an anti-rotation sleeve 32 is attached to the housing 12. Sleeve 32 does not move relative to housing 12 in any way once the tool is assembled. Anti-rotation sleeve 32 includes one or more pin openings 34 into which one or more pins 36 will be individually inserted. Each pin 36 will thus be fixed to the anti-rotation sleeve 32 and extend into an alignment groove 38 of which there will be one or more in the j-slot sleeve 30. The one or more pins 36 and respective alignment grooves 38 ensure that the j-slot sleeve 30 is not rotatable but is permitted to move only axially during operation of the tool 10. Upon movement of the collet 22 induced by fluid pressure uphole of plug 20 as described above, the j-slot sleeve 30 will cycle back and forth axially of the tool 10.

Radially inwardly of the anti-rotation sleeve 32 and rotatable relative thereto is a helix sleeve 40 exhibiting a helical track 42 at an outside surface thereof. The helix sleeve 40 includes one or more j-slot followers 44 (one shown), which may be a part of the helix sleeve 40 or may be a separate component that is engaged with the helix sleeve 40. In either event, the j-slot follower(s) 44 are configured to contact angled surfaces 46 and 48 of a j-slot 50 (see FIG. 5) disposed at the j-slot sleeve 30 upon axial movement of the j-slot sleeve 30. Because followers 44 are fixed to the helix sleeve 40, the helix sleeve 40 will move rotationally about the j-slot sleeve 30 as the followers 44 move along each angled surface 46 or 48. The impetus for this movement is the axial cycling of the j-slot sleeve 30 as described above. Each time a plug 20 lands at the seat 16, thereby allowing pressure to build from uphole against the plug 20, and hence urging the collet 22 to a position aligning the fingers 18 with recess 28, the followers 44 will contact and slide along one of the angled surfaces 46. This will cause a measured or indexed rotation of the helix sleeve 40. Because the spring 24 is compressed during this pressure induced axial movement, energy is stored that will be used to urge the followers 44 along the next adjacent angled surface 48 pursuant to the j-slot sleeve 30 moving uphole under spring bias, causing another measured or indexed rotation of the helix sleeve 40. The spring 24 induces such movement only after the plug 20, against which fluid pressure had been applied, is released.

Figure 8:
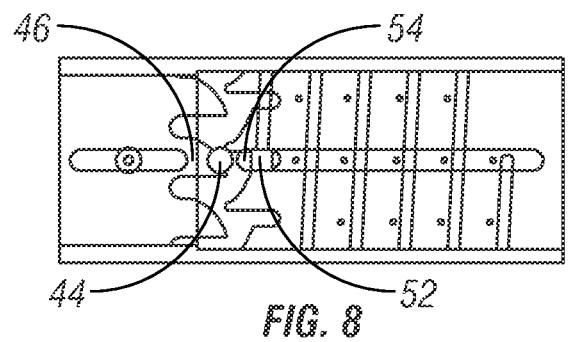

As the helix sleeve 40 rotates, a key 52 that is engaged with the helical track 42 moves leftward in the drawing closer to an end 54 of a keyway 56. It is to be appreciated that although the illustrated embodiment moves in an uphole direction, the tool 10 can easily be configured to allow movement of the key 52 in a downhole direction by reversing the helix angle of the helical track 42 and reversing the surface angles of surfaces 46 and 48. As illustrated in FIGS. 1 and 5, the key 52 is in a position that will allow the greatest number of plugs to pass before preventing passage of the next plug to be seated. FIGS. 4 and 8 show the key in the position where the next plug to seat will not pass.

As configured the tool 10 will pass a number of plugs and then prevent further passage of plugs because the helix sleeve 40 is prevented from rotating by the contact between key 52 and an end 54 of keyway 56. The prevention of rotation of the helix sleeve 40 correspondingly prevents the j-slot sleeve 30 from cycling downhole sufficiently to allow the fingers 18 to reach the recess 28. Consequently the plug 20 cannot pass. This position is illustrated best in FIG. 8 where key 52 is at end 54 and follower 44 is at surface 46 but it cannot slide on surface 46 because the key will no longer allow rotation of the helix sleeve 40 due to having run out of helical track 42. It is to be understood, then, that the maximum number of plugs that are passable through tool 10 are fixed by design during manufacture by the length of the helical track 42 and the keyway 56. This is not to say however that this maximum number of plugs is the only number of plugs that will be passable before a plug is denied passage. Rather, because the key is placable in the keyway 56 as the tool is being run into the hole, at any point on the helical track 42 that is exposed to the keyway 56, any number from the maximum number down to a single plug may be selected.

More specifically, the key 52 is a component of the tool 10 that is removable and replaceable at any point along the keyway 56 where the helical track 42 crosses the keyway 56. The helix sleeve 40 itself may be marked to show how many plugs will pass before denying passage to make it a simple operation in the field for a rig worker to place the key in the keyway 56 to select a number of plug passages to facilitate a particular operation. It should be noted that because of the high pressures generally encountered in the wellbore for operations related to seating plugs and the potential operations that might be effected by pressuring up on such a plug, for example fracturing at about 10,000 psi, the key 52 should be robust in size and construction as it is, in the end, the key that stops movement of the balance of the components.

Figure 9:
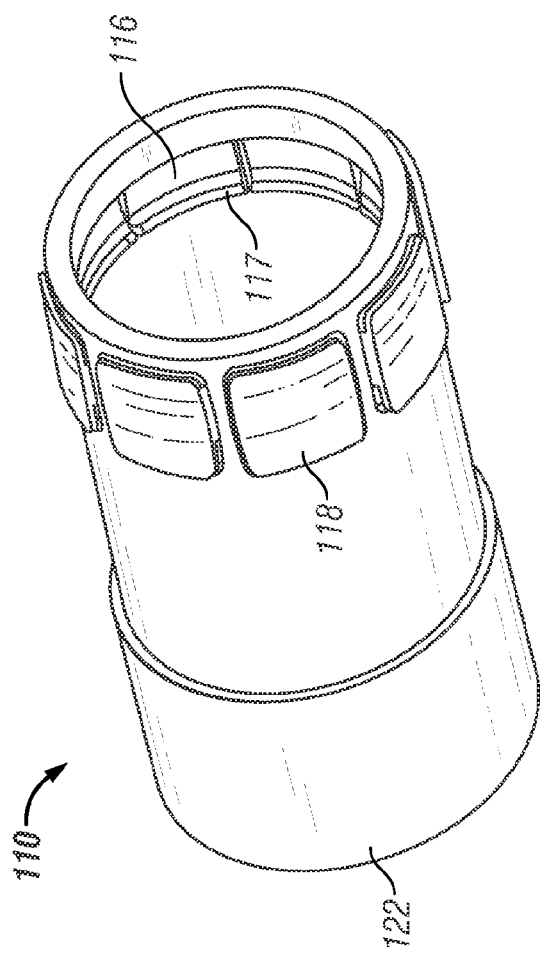
FIG. 9 is a perspective view of an alternate moveable seat substitutable in the tool.
Figure 10:
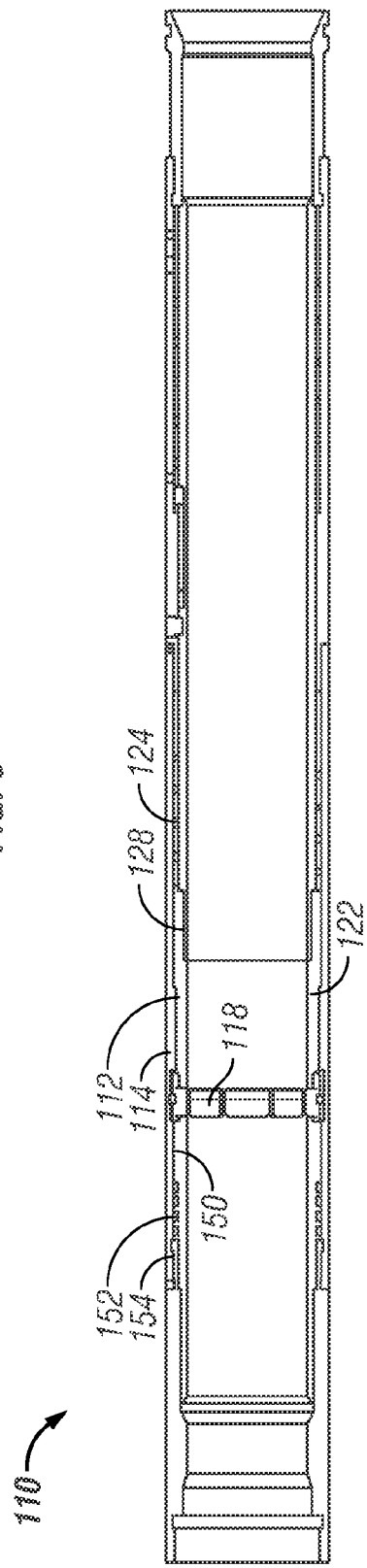
FIG. 10 is a schematic view of a portion of an alternate housing of the tool 10 shown in FIG. 1.

Referring to FIGS. 9 and 10, an alternate embodiment of a portion of plug counter tool 110 is illustrated. The embodiment operates similarly to the tool 10 and identically operating components are not discussed again. The tool is distinct in that a dog-based seat structure 122, having a plug seat 116, is substituted for the collet 22 in the FIG. 1 embodiment. For clarity, numerals are mimicked in the 100 series. In normal operation, dogs 118 function as do the fingers 18 from the previous embodiment. The housing 112 is also distinct in that an additional plug passage recess 150 is provided uphole of the support 114 so that in reverse flow, the one or more dogs 118 can be moved into alignment with the recess 150 to allow passage of one or more plugs 20 in the uphole direction as part of a reverse circulation operation to remove the plugs 20 from the borehole. In order for the structure 122 to move uphole, a plug that had been passed in normal operation of the tool 110 is moved in reverse circulation into a seat 117 on the backside of seat 116. The pressure of reverse circulation acts on the plug in the same manner as in the original operation but in the opposite direction. A spring 152 is disposed uphole of the structure 122 and will be compressed against a top sub 154 at a selected force from fluid pressure on the plug. Movement of the structure 122 in the uphole direction mirrors that of movement in the downhole direction and aligns the dogs 118 with the recess 128, which allows the plug to pass. While an embodiment could eliminate spring 152 and simply allow the structure 122 to stay in the uphole position, including the spring 152 provides the added benefit that the device will automatically revert to a functional state after passage of the plug in the uphole direction so that normal operation of the tool 110 could be resumed if desired. Since reverse circulating has specifically been addressed with respect to this embodiment, it is further noted that a dissolvable or disintegratable plug can be used thereby obviating the need for reverse circulation to remove the plug. Such dissolvable or disintegratable plugs can be used in each embodiment of the invention, if desired.

Figure 11A:
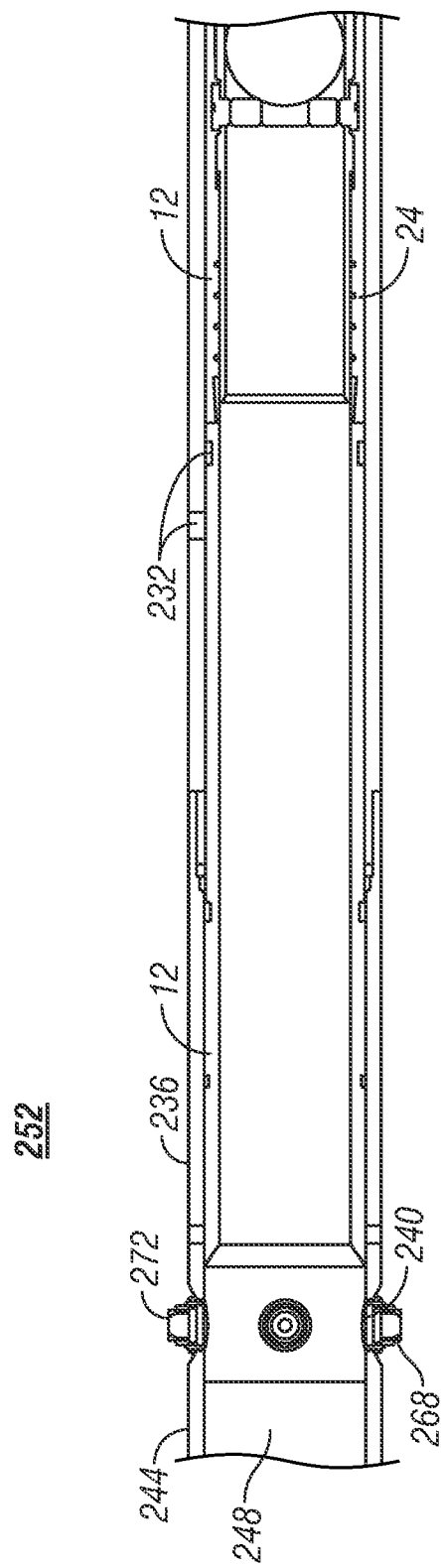
FIGS. 11A-11C depict a cross sectional view of an embodiment of a plug counter disclosed herein.
Figure 11B:
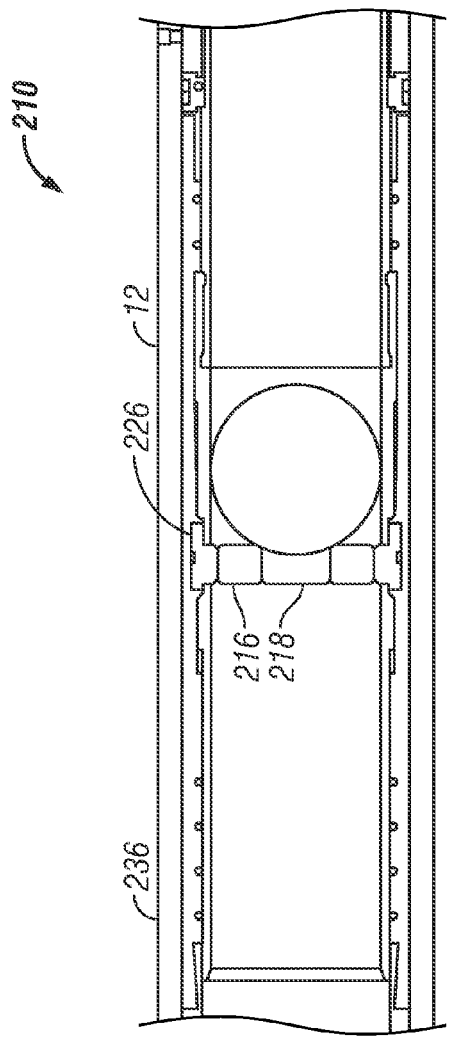
Figure 11C:
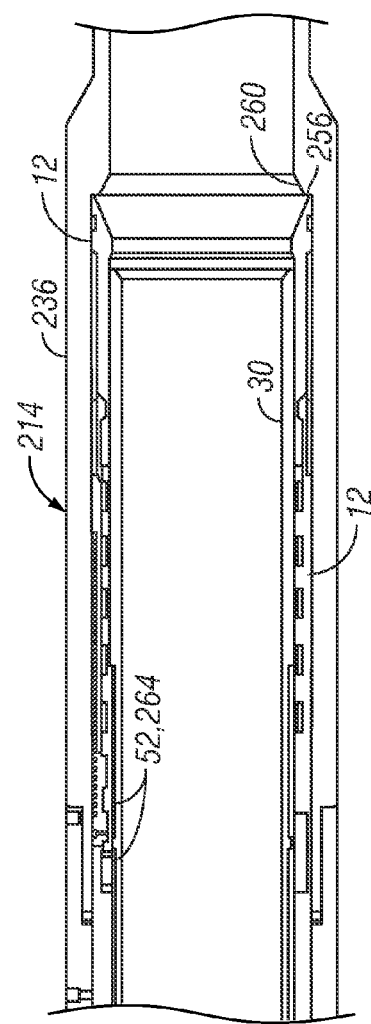

Referring to FIGS. 11A-11C, an embodiment of a plug counter 210, disclosed herein, is illustrated that incorporates features of the tools 10 and 110 therein. The tool 210 includes a helical counter arrangement 214, similar to that disclosed in FIGS. 1-8 therefore the same reference characters are employed here. A plug seat 216 that is passable is also included. The plug seat 216 has one or more dogs 218 that are radially expandable into a recess 226 in a tubular 230 upon longitudinal movement that causes the dogs 218 to align with the recess 226. Although this embodiment employs a single passable seat arrangement it should be understood that any passable seat arrangement could be employed including the plugs seat 16 described in FIGS. 1-4.

A primary difference in the plug counter 210 from that of tools 10 or 110 is what occurs after the selected plug has caused the key 52 to prevent further longitudinal movements of the plug seat 226. Unlike the above embodiments, in the embodiment of counter 210 the plug 20 is still allowed to pass but only after failure of a release member 227 also disclosed herein as a force failing member (shown in FIG. 11C only) illustrated herein as shear pins.

To achieve this the plug counter 210 is configured to index the helical counter 214 each time one of the plugs 20 passes. Doing so entails building pressure against the plug 20, seated against the seat 216, until sufficient pressure is achieved to compress biasing member 24 thereby allowing j-slot sleeve 30 to move relative to housing 12 (in a rightward direction in the Figures). Since the recesses 226 are on the housing 12, the plug 20 is allowed to pass the seat 216 when the j-slot sleeve 30 has moved to the point where the dogs 218 reach the recess 226. As mentioned, each time one of the plugs 20 passes in this manner the helical counter 214 indexes.

After passing the selected number of plugs 20 to cause the helical counter to max out the key 52 prevents the J-slot sleeve 30 from moving at the same force that previously caused it to move. The force increases, in response to pressure increasing uphole of the seated plug 20, until sufficient force is generated to fail a force failing member 232 that holds the housing 12 in position relative to a tubular 236 within which the housing 12 and all the other components discussed previously are positioned. The force failing member 232, shown herein as a shear pin, is shown in an already sheared condition and thus is in two separate pieces.

Longitudinal movement of the housing 12, made possible by failure of the force failing member 232, allows the uncovering of one or more ports 240 formed in a wall 244 of the tubular 236. These ports 240 when uncovered are configured to provide fluidic communication between an inside 248 and an outside 252 of the tubular 236. The ports 240 may, however, be plugged at least for a time as will be discussed further below. The ports 240 disclosed herein are fracing ports that allow fluid pumped therethrough to fracture a formation on the outside 252 of the tubular 236.

Longitudinal movement of the housing 12 relative to the tubular 236 is limited by contact between an end 256 of the housing 12 and a shoulder 260 of the tubular 236. Pressure is again allowed to increase resulting in increased forces in response to the housing 12 not moving. Another force failing member 264 preventing additional travel between the J-slot sleeve 30 and the housing 12 fractures when sufficient force is applied. In this embodiment, this second force failing member 264 is the key 52 itself. Once the key 52 is fractured the J-slot sleeve 30 is again allowed to move relative to the housing 12 until the plug seat 216 aligns with the recess 226, thereby allowing the plug 20 to pass. In order to assure that the ports 240 are uncovered before the plug 20 passes, the first force failing member 232 needs to be set to fail at a lower force than the second force failing members 264.

The foregoing construction allows for any number of the plug counters 210 to be employed for opening fracing ports 240 upon the running of a selected number of plugs 20. A fracing operation can also be carried out just by altering the force need to fail one of the force failing member 232 or 264 at one of the plug counters 210 downhole of the other plug counters 210. The higher threshold need only be set to a pressure higher than is needed to perform a fracing operation to assure that the fracing can take place.

Having a plurality of the ports 240 above a plug counter 210 open can make generating pressure sufficient to fail either force failing member 232, 264 of the downstream plug counter 210 difficult. One way to address this concern is to plug the ports 240 with material that can be removed at a desired later time. For example, a disintegratable material 268 can be used to plug the ports 240 until the ports are exposed to fluid from the inside 248, for example. By fluidically sealing the disintegratable material 268 with a rupturable material 272 on an outer surface thereof, the onset of disintegration can be delayed until the housing 12 has been moved to thereby expose the disintegrable material 268 to the reactive fluids on the inside 248. Alternately, the disintegrable material 268 can be set to disintegrate in response to other stimulus such as changes in temperature and pressure for example.

Yet another method of removing a blockage from the ports 240 at a desired time is by using just the rupturable material 272 without the disintegratable material 268. To do so one need set a pressure at which the rupturable material 272 ruptures at pressures greater than is required to fail the force failing members 232, 264 of all the plug counters 210 that are to be opened for fracing and less than a pressure to fail a force failing member 232, 264 of the plug counter 210 being used to plug the downstream end of the tubular 236.

Figure 12:
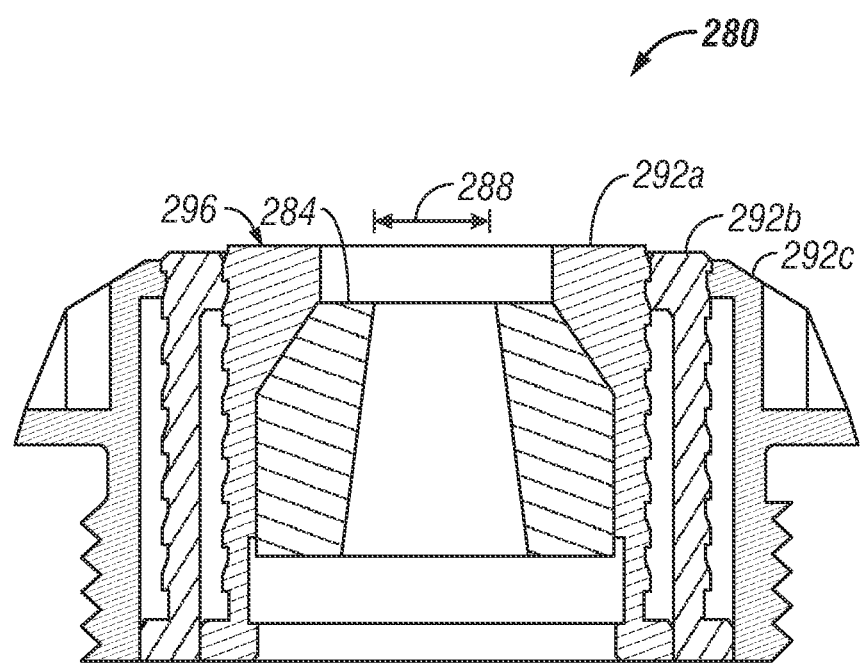
FIG. 12 depicts a magnified cross sectional view of a telescoping port disclosed herein.

Referring to FIG. 12, another embodiment of a port disclosed herein that could allow sufficient pressure to build to fail either force failing member 232, 264 is illustrated at 280. The port 280 includes a nozzle 284 with an opening 288 sized to generate backpressure in response to flow therethrough. A dimension of the opening 288 can be selected based upon the number of the ports 284 that will be open at a given time and flow rates available to generate a backpressure sufficient to fail the applicable force failing member 232, 264. The ports 284 in this embodiment have three optional telescoping sleeves 292A, 292B and 292C, although any number of the sleeves 292 could be employed. The telescoping sleeves 292A, 292B and 292C are configured to extend relative to one another such that a radially outer surface 296 is radially extendable in response to the sleeve 292A moving relative to the sleeve 292B, and the sleeve 292B moving relative to the sleeve 292C. This configuration allows the sleeve 292A to move into sealing contact with a wall (not shown) of a formation, for example, to facilitate inject of fluid pumped through the port 280, under pressure, directly into the formation. The telescoping sleeves 292A, 292B and 292C can be set to telescope at pressures less than what is required to fail either of the force failing members 232 or 264.

Figure 13:
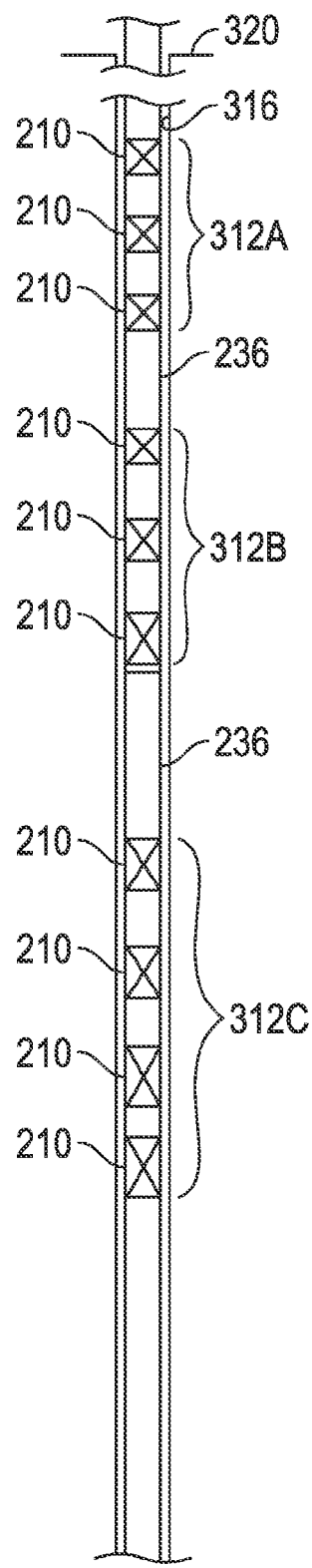
FIG. 13 depicts a schematical view of a wellbore having a plurality of clusters of plug counters disclosed herein.

Referring to FIG. 13, with such a set up a plurality of clusters 312A, 312B, 312C of plug counters 210 could be positioned along a single tubular 236 within a wellbore 316. Working from the cluster 312C furthest from surface 320 first, each cluster could in sequence be opened and fraced through, all with the same sized plug 20.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A treating valving system comprising:
a plurality of plug counters with one or more of the plug counters being configured to open a respective valve responsive to passage of an additional plug after a selected number of plugs have passed the one or more of the plug counters, and one of the plurality of plug counters downstream of the one or more of the plug counters being configured to prevent passage of the plug after the selected number of plugs have passed the one of the plurality of plug counters downstream of the one or more of the plug counters allowing pressure to be built upstream of the one of the plurality of plug counters downstream of the one or more of the plug counters and treating to take place through the opened valve.

2. The treating valving system of claim 1, wherein the plug and the selected number of plugs have at least one dimension that is substantially the same.

3. The treating valving system of claim 1, wherein the one of the plug counters and the one or more of the plug counters define a cluster of plug counters and one or more additional clusters of plug counters function in the same manner and all of the plug counters of all of the clusters are actuatable by plugs having at least one dimension that is substantially the same.

4. The treating valving system of claim 1, wherein the plug and the selected number of plugs have substantially the same dimensions.

5. A method of treating multiple zones, comprising:
running a plurality of plugs having at least one dimension that is substantially the same;
indexing a plurality of plug counters with each of the plurality of plugs run;
opening a valve with one of the plurality of plug counters with the running of a first one of the plurality of plugs;
plugging one of the plurality of plug counters with the running of the first one of the plurality of plugs;
pressuring up and treating a formation through the opened valve;
running more of the plurality of plugs;
further indexing some of the plurality of plug counters with each of the plurality of plugs run;
opening another valve with the running of a second one of the plurality of plugs;
plugging one of the plurality of plug counters with the running of the second one of the plurality of plugs; and
pressuring up and treating a formation through the opened valve.

6. The method of treating multiple zones of claim 5, wherein the first one of the plurality of plugs and the second one of the plurality of plugs are selectable from the plurality of plugs.

7. The method of treating multiple zones of claim 5, further comprising physically altering each of the plug counters as each of the plug counters are indexed.

8. The treating valving system of claim 5, wherein the treating comprises fracing.

9. A treating valving system, comprising:
a plurality of same sized plugs; and
a plurality of clusters of valves, with a cluster of valves being defined as a group of the valves that are configured to be openable by the plurality of same sized plugs and each cluster of valves of the plurality of clusters of valves having an outlet being pluggable separately from each of the other clusters of valves of the plurality of clusters of valves, and a plurality of the valves within one of the clusters of valves being physically altered in response to passage of one of the same sized plugs thereby prior to plugging of the outlet of one of the cluster of valves.

10. The treating valving system of claim 9, wherein the physical altering of the plurality of valves keeps count of the number of the same sized plugs that have passed thereby.

11. An apparatus for restricting flow through a conduit, comprising:
a plurality of counters positionable within the conduit, the plurality of counters configured to count a number of plugs that pass thereby;
a first of a plurality of plug seats in operable communication with a first of the plurality of counters and a valve, the apparatus being configured to allow passage of a selected number of plugs past the first of the plurality of counters and to temporarily prevent passage of a first plug after the selected number of plugs has passed the first of the plurality of counters such that the valve can be opened responsive to pressure built against the first of the plurality of plug seats while temporarily plugged by the first plug, the apparatus being further configured to allow the first plug to pass after the valve has been opened; and
a second of the plurality of plug seats in operable communication with a second of the plurality of counters, the apparatus being configured to prevent passage of the first of the plurality of plugs until after treatment of a formation through the opened valve is completed.

12. The apparatus for restricting flow through a conduit of claim 11, wherein pressures required to pass the first of the plurality of plugs past the first of the plurality of plug seats is selectable.

13. The apparatus for restricting flow through a conduit of claim 11, wherein passage of the first plug past the first of the plurality of plug seats is allowed responsive to pressures greater than that needed to open the valve being applied against the first plug.

14. The apparatus for restricting flow through a conduit of claim 11, wherein the selected number of plugs and the first plug after the selected number of plugs all have the same dimensions.

* * * * *